United States Patent

Golub

[15] 3,635,816

[45] Jan. 18, 1972

[54] METHOD OF PURIFYING CITRUS PLANT EFFLUENT AND RAISING WORMS AND FISH

[72] Inventor: Gerald Golub, 1879 Via Genoa, Winter Park, Fla. 32789

[22] Filed: Aug. 12, 1969

[21] Appl. No.: 849,473

[52] U.S. Cl. .................................. 210/2, 210/17, 119/1
[51] Int. Cl. ................................................. C02c 1/02
[58] Field of Search ............... 119/1, 3, 5; 210/2, 14, 17, 210/59

[56] References Cited

UNITED STATES PATENTS

| 2,822,329 | 2/1958 | Griffith | 210/14 |
| 2,867,055 | 1/1959 | Lebiedzinski | 119/1 X |
| 2,992,986 | 7/1961 | Ingram | 210/17 |
| 3,115,864 | 12/1963 | Wagner | 119/1 |
| 3,129,692 | 4/1964 | Sanderson | 119/1 |
| 1,685,301 | 9/1928 | Travers | 210/59 |

OTHER PUBLICATIONS

The Chemistry of Water and Sewage Treatment, by Arthur M. Buswell, published by The Chemical Catalog Company, Inc., New York, Page 334 is cited.

K. L. Schulze, Biological Recovery of Wastewater, Water Pollution Control Federation Journal, Dec. 1966, pp. 1944–1957

*Primary Examiner*—Reuben Friedman
*Assistant Examiner*—Thomas G. Wyse
*Attorney*—Sughrue, Rothwell, Mion, Zinn & Macpeak

[57] ABSTRACT

Removable filter units consisting of environmental support material holding captured worms, or great numbers of monosex fish, either separately or in combination are in operative contact with a constantly changing body of liquid for removing organic pollutants while allowing periodic harvesting of mature worms and fish.

1 Claims, 1 Drawing Figure

PATENTED JAN 18 1972 3,635,816
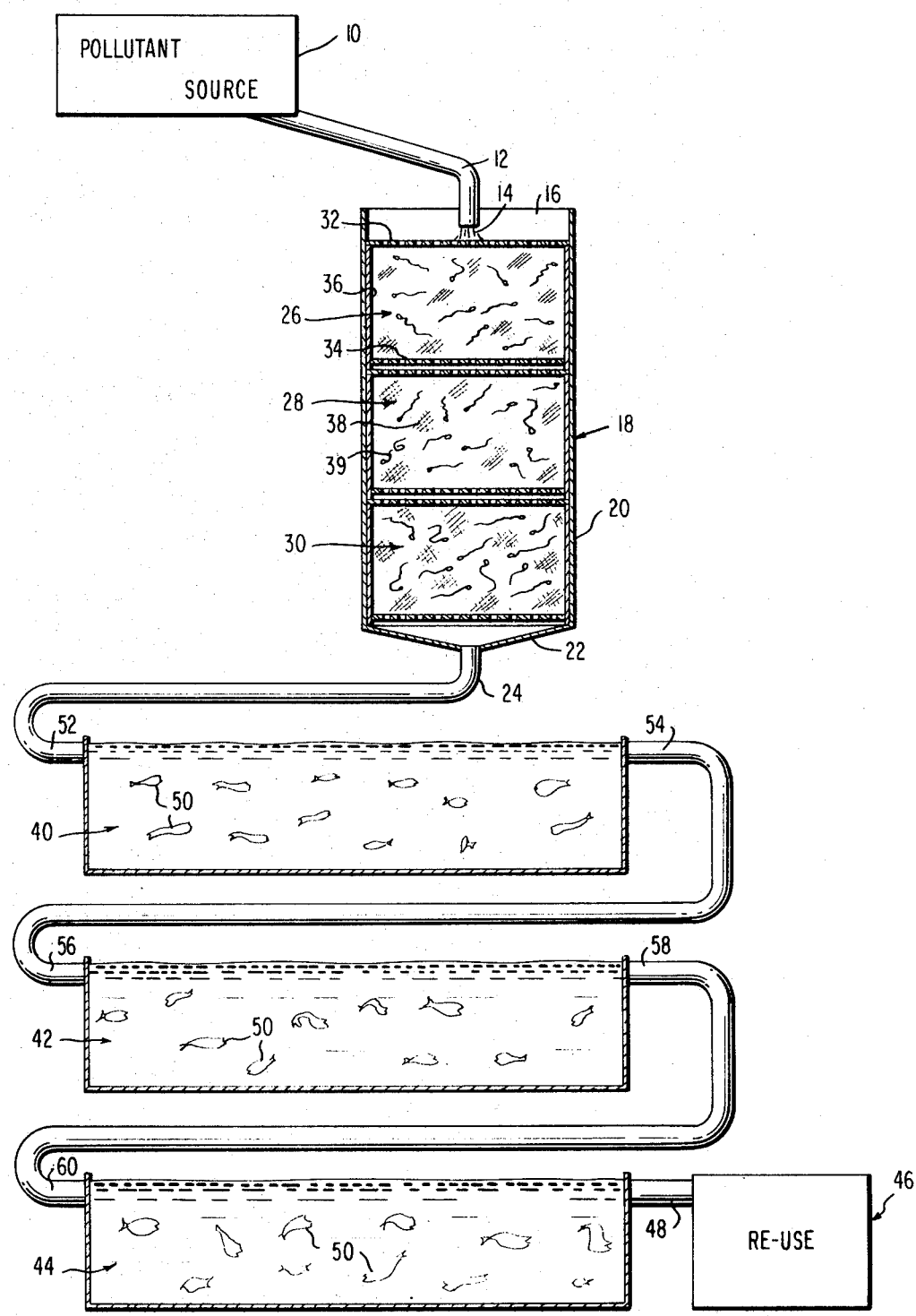
GERALD GOLUB, INVENTOR
BY
ATTORNEYS

METHOD OF PURIFYING CITRUS PLANT EFFLUENT AND RAISING WORMS AND FISH

BACKGROUND OF THE INVENTION

1. Field of the Invention

This invention relates to the treatment of dilute organic pollutants and more particularly to the treatment of the same by worms, algae, and fish for both pollution control of the liquid being treated and the breeding, raising and harvesting of mature animals subjected to the environment.

2. Description of the Prior Art

Citrus processing plants are incurring huge expenses in disposing of washings and waste from their packing houses. Due to Federal and State controls, it is impossible to dispose of these wastes by directly discharging the same into adjacent natural bodies of water. The waste from the citrus processing plants constitutes an organic pollutant which is comparable with typical household sewage and may be contrasted to industrial wastes in the form of pollutant liquors containing petroleum oils and/or industrial chemicals, since these would have a killing effect on animal life. The present known pollution controls for organic pollutants are relatively expensive and require rather large treatment plants. The public is no longer indifferent to the wasting and destruction of the natural bodies of water such as lakes, streams, rivers and estuaries which in the past have received pollutants without treatment, even though the price of land and labor is at an all time high.

At the same time, there is an increasing need for the selective breeding, raising and harvesting of animals such as the common earth worm, and fish which may be harvested in filet form or whole form for fertilizer. Earth worms are in great demand by sports fisherman and, due to the fact that they are 90 percent protein, readily form food for other animals such as dogs, cats, and the like.

SUMMARY OF THE INVENTION

The present invention is directed to pollution control of organic pollutants in liquid form by allowing the organic pollutants to be eaten by great numbers of three-dimensional-type animals of either the land or water variety under close control and in particular, to controlled and selected breeding, growth and harvesting of the same animals as commercial saleable products.

The method of pollution control and environmental breeding and harvesting of the animals and the system for achieving the same involves directing dilute liquids carrying organic pollutants through a constructed container or a natural container such as a pond or bed carrying a mass absorbent or adsorbant type of material such as peat moss or shreaded paper supporting a great number of worms such as the common earth worm variety. The dilute liquor is passed through the bed where the pollution is absorbed or adsorbed by the bedding material with the worms feeding on the same in a continual filtering process. Preferably, the filter bed consists of removable units in the form of perforated containers holding the absorbent or adsorbant material, the unit containers being stacked one upon each other with the fluid passing therethrough in gravity fashion. New containers of young earth worms may readily replace those carrying mature worms which are thus harvested and sold to sports fishermen for bait.

The system further comprises a plurality of other treatment containers, preferably downstream of those containers carrying the earth worm beds, said other containers constituting a selected environment of monosex fish of the high fecundity type that feed on the lower end of the food chain such as the Tilapia. The ponds must be separated and the ponds are continuously sampled until the fish population approaches 10,000 lbs. per fish per acre. Isolated breeding ponds and ponds separated into male and female sexes are fluid coupled in series or parallel within the treatment system. Crayfish may be selectively added to one or more of the ponds since they live mainly on the pond bottom and prosper on dead fish as well as the nutrients in pond sediments.

BRIEF DESCRIPTION OF THE DRAWING

The single FIGURE is a partial sectional and schematic view of the proposed animal breeding environmental and pollution control system of the present invention in one form.

DESCRIPTION OF THE PREFERRED EMBODIMENT

Referring to the drawing, the system and method of the present invention involves a pollutant source 10 which is shown in block form and delivers through an outlet pipe 12, the dilute organic liquid 14 such as household sewage or citrus plant effluent. This invention is particularly applicable to organic solutions (100–100,000 parts per million of organic material) that can be utilized directly or indirectly, after some bacterial action, by animals for their food supply. In other words, some of this material may actually form some type of intermediate material like plankton or algae which these animals will eat directly off of. Preferably, the liquid 14 is gravity discharged into the open end 16 of a formed treatment container 18 although the container could be a natural land depression with the effluent captured therein forming a pond or the like. The container 18 may be formed of metal or other imperforate material and is provided with a cylindrical sidewall and an imperforate bottom wall 22 to which is coupled the treatment container outlet 24. Preferably, the liquors are filtered through a bed or worms comprising a series of stacked filter units 26, 28, and 30, the filter units consisting of at least some perforated walls. In the form shown, the top and bottom walls 32 and 34, respectively, are perforated while sidewall 36 is solid. The filter units are stacked one upon the other such that the dilute pollutant liquor 14 passes through the bed by gravity action with the pollutant being absorbed or adsorbed by the bedding material. In this respect, the bedding material 38 consists of peat moss or shredded paper and interspersed within the same are a great number of three-dimensional-type animals such as worms 40. The worms may average 100 per cubic foot.

The filtrate free of pollutants is drained away from the beds through the outlet pipe 24 and is directed preferably to a series of subsequent treatment containers or ponds 40, 42, and 44 which are fluid coupled in series. The outlet from the last treatment container or pond 44 is directed for reuse or ultimate disposal to an end facility indicated in block form at 46. The excess water which passes through outlet 24 and eventually to the end use device 46 will contain little if any impurities and this may be readily disposed of by discharge into a convenient natural body of water such as stream, estuary, or the like. The absorbed or adsorbed pollutant will be digested by the worms along with bedding material 38. The resultant digested material is a finely pulverized odorless humus and constitutes the finest potting or mulching soil available. Since the worms carried by the individual stacked filter units lie in random fashion in the absorbent material 38 they may be removed when matured and sold to sports fishermen as bait. However, since they constitute 90 percent protein, they may form, when processed, a high protein food for other animals such as dogs, cats, etc. Subsequent to the removal of these worms, any material remaining in each of the perforated stacked filter units is in a finely pulverized, odorless humus yield that constitutes the finest potting and mulching soil available and is readily saleable to gardeners, florists, builders, or the like. Thus, there results two end products which are saleable, the mature animals such as earth worms, and the resulting humus. Since the liquor 14 is discharged from pipe 12 and moves by gravity through the stacked filter units 26, 28, and 30, the filter units are not immersed in liquid. Worms such as night crawlers, field worms, garden worms, and red worms, may be used.

In passing the pollutant liquor 14 through the beds, it should not be placed equally over the entire surface but should lie discharged in the center thereof, so as to allow the worms an opportunity to approach or feed on this material. The volumetric advantages of having the liquid go through the beds allows the worms to feed at all depths, not just on the surface or a few inches therefrom. This reduces the cost of sheltering the livestock since the biggest shelter cost is in the roof and its support. The worms can be brought to the surface for harvesting by discontinuing the liquid feed and placing the solid feed on the bed surface or on each of the filter unit surfaces. Several types of worms may be used for this application as set forth above.

Where the filtrate liquid is directed to a conventional or performed enclosure such as a pond, the liquid when exposed to an algae culture in the pond, will release its dissolved pollutants (nitrates and phosphates) as feed for the algae and will receive oxygen that will destroy any bacteria present. If present, Tilapia fish will devour the algae and the placenta produced, thus leaving a solution of low or no BOD requirements, free of solids, color and odor.

Certain additives may be required for the pollutant liquids, notably limerock to increase the pH of the water to near 7 in order for the worms and fish to prosper in the environment. It must be remembered that the invention is limited in that certain types of pollutant liquors containing petroleum oils and/or industrial chemicals cannot be used since they would destroy or weaken the three-dimensional animals. In addition to the treatment of dilute organic pollutants, the system and method of the present invention is directed to a controlled fish breeding environment using sewage ponds as the selected environment to perform the dual function of removing the organic pollutants or greatly reducing the same, and the provision of rapid, controlled growth of live animals or fish of high fecundity that feed on the lower end of the food chain such as Tilapia.

In this respect, in the illustrated system of the drawing, there is provided in addition to the treatment container 18, in tank or pond form series connected treatment containers, tanks or ponds 40, 42, and 44. These treatment tanks contain a large number of fish 50, such as Tilapia. For the selective breeding and rapid maturing of such fish, a large number of widely scattered ponds are required in order to be assured that the fish do not travel via hosts (birds) from pond to pond or treatment tank to treatment tank. This invention provides a practical and economic environment for the production of selectively bred fish. As each generation of fish must be sorted for the selected variety and size, numerous ponds are required. Adequate spacing of ponds must be insured in order to maintain desired separations. Although fish by themselves cannot travel on land, various hosts such as birds carry them between closely spaced ponds. Thus, tanks 40, 42, and 44 may be separated by thousands of feed and if necessary covered with screening to prevent transfer of fish from one tank to the other. In this respect, the outlet 24 from treatment tank 18 is directly connected to the inlet 52 of tank 40 outlet 54 from this tank is coupled to inlet 56 of tank 42 and outlet 58 is coupled to inlet 60 of tank 44.

The proposed environment insures a monosex fish culture for high fecundity type fish such as the Tilapia. The Tilapie begin breeding at three months when they are only 3 inches long. They breed continuously throughout the year. A single pair of breeding Java Tilapia increases to about 15,000 in 1 year. The high rate of production is a result of the Tilapia caring for their brood in their mouths; hence, the name of "-mouthbrooders." The small tilapia eat the same small bits of algae and plankton that larger tilapia eat and therefore can compete successfully for food with the larger tilapia. To get larger (eatable) marketable fish it is necessary to stop the fish from breeding and separate the sexes. However, a single sex mistake can prevent a whole pond from growing to a large marketable size fish, hence the need for a holding or sex-proving pond before releasing the sexed fish into larger raising ponds. (Thus, for instance, pond or tank 40 may constitute a holding or sex proving pond while ponds 42 and 44 constitute the large raising ponds.)

The sewage ponds 42 and 44 are ideally suited for this purpose because of the water's high-nutrient values due to their constant fertilization. These nutrients produce large quantities of algae and plankton which a small breeding fish feed and prosper, thus eliminating the need for feeding the fish through additives. In addition, these ponds are located in different locations with adequate spacing to prevent contamination from unwanted fish. In accordance with the preferred embodiment of this invention, a group of sample Tilapia are placed in such a sewage pond as 40 and allowed to multiply. The pond 40 in continually sampled until the fish population approaches 10,000 pounds of fish per acre. At that time, the smaller male fish are removed until the ratio of 3 to 5 females per male is established. The males are raised separately for food filets in either pond 42 or 44, for instance. The fish population is allowed to rise to 8,000 to 10,000 pounds of fish per acre. At that time, the males and females are sorted for monosex raising to market size such by placement in pond 44 for instance. The larger specimens are returned to the pond 40 for breeding and to repeat the cycle. The object is a continual increase in the desired characteristics of the fish both as to the monosex raise and the breeding stock. Surplus fish can be sold to tropical fish stores or can be used as food for predator fish such as channel catfish or bass. It is proposed to simultaneously raise and improve another species within the same pond such as a crayfish. The crayfish lives mainly on the pond bottom or digs into the mud and prospers on dead fish as well as the nutrients in the pond sediments. The system illustrated is particularly applicable to organic solution (100 to 100,000 p.p.m.) that can be used directly or indirectly after some bacterial action by animals for their food supply. As an example, a square foot of the earth worm beds in unitary or stacked filter arrangements such as that found in the tank 18 of the illustrated embodiment will consume 2 gallons of dilutent organic liquid waste in 24 hours. It is estimated therefore that for a liquid treatment system comprising 65,000 cubic feet of earthworm beds having a population of 100 earth worms per cubic foot will be sufficient to treat organic dilute pollutant liquid having the following characteristics. 250,000 gal./day with 1½ percent b.w. organics, and present an effluent which may be readily discharged without further treatment in a natural body of water. It is further noted that the earth worm treatment beds may be employed in conjunction with one or more tanks carrying fish such as those indicated at 50 or the fish raising tanks may be employed in lieu of the earth worm filter units or as an integral portion thereof. In accordance with one embodiment of this invention as used for removing pollutants from citrus plant process effluent, these liquors are filtered through a bed of worms in a bedding consisting of an adsorbent type of material such as peat moss or shredded paper. The dilute pollutant liquor is passed through the bed where the pollutant is absorbed or absorbed by the bedding material. In more detail, consider a particular organic pollutant that is the waste liquors from a citrus plant. In such a plant the material is typically acid that it has a pH somewhere between 3 and 3.6 however, if a large quantity of wash water is added to it the pH may actually reach 7 or slightly above it. So we are only talking of a typical solution where the pH is around 3 to 3.6. Dissolved solids are usually approximately 1 percent by weight and the particulate solids that is the solids that can be filtered out easily are about 1/5 percent b.w. or there is about 1½ percent b.w. of pollutant material. The phosphorous content is negligible and the protein content is negligible and since it is dilute the density is close to water and the viscosity is close to water. The material has an odor characteristic of citrus and after standing for a period of time attracts a large number of flies. If allowed to stand further it ferments.

When one considers the economic value of this material and it is assumed that 1 gallon of water weighs 8 pounds and that organic feed, typically corn, costs $70.00 per ton or 3½ cents per pound, then 1,000 gallons or 8,000 pounds of this liquid has 80 pounds of organic material. It could be used as corn and has a worth of approximately $2.50 or ¼ of a cent per gallon. This liquid is typical inasmuch as there is a small amount of "goodies" and a large amount of material.

Now look at the potential uses of this material. The material is so dilute it cannot be moved, for the cost of transportation would be prohibitive. It is not useful for things such as feed for oysters or fertilizer directly because of its dilution, but consider it as a use for worm food. Assume that the material is neutralized with ground limestone at approximately $8.00 per ton and assume that it takes about 1 square foot to get rid of 2 to 4 gallons of effluent per day. Assume further that a typical plant releases 250,000 gallons per day of liquor. So the need is between 125 to 165,000 square feet of worm beds. Approximately 200 square feet of worm beds yields about 20,000 worms per day which weigh about 80 pounds, considering it takes 250 worms to the pound. Assume a feed conversion of the worms of 2 to 1. By multiplying 250,000 gallons times 80 divided by 1,000 times 2 this equals 10,000 pounds of worms per day or about 2½ million worms per day at $2.00 per thousand is $5,000.00 per day return considering that the $2.00 per thousand is conservative inasmuch as it is necessary to subcontract the picking, harvesting and marketing. A typical worm bed produces about 100 worms per square foot per day or 25,000 square feed for 2½ million worms and since this is about what the water absorption requirements (65,000 square feet) the worms will not be too crowded. An operation of this size could probably be handled by two men with some equipment.

Several types of worms as used for this application include the night crawler, field or garden worms and the red wriggler worm. The filtrate liquid exposed to an algae culture in a pond will release its dissolved pollutants (Nitrates and phosphates) as feed for the algae and will receive oxygen that will destroy any bacteria present. The Tilapia fish will devour the algae and the plankton produced, thus leaving a solution of low or no B.O.D. requirements free of solids, color and odor. For example the Copyara rodent. It might be added that certain additives may be required for these pollutant liquids, notably limerock to increase the pH of the water to near 7 in order for the three dimensional animals such as worms and fish to prosper in the environment. Both worms and fish do not like an acid environment but would appreciate it being close to 7 or slightly above it.

What is claimed is:

1. A method of removing organic pollutant from acidic liquid citrus plant effluent and raising worms and fish comprising the steps of;

neutralizing the acidic liquid citrus plant effluent to enable the effluent to feed worms;

passing the neutralized effluent through a removable filter bed housing worms to separate solid organic matter from the effluent for feeding the worms;

removing the filter bed when the worms have matured to a predetermined size;

replacing the filter bed containing the matured worms with another removable filter bed housing young worms;

passing the remaining liquid effluent from the removable filter bed to a succeeding algae containing environment which further contains fish of high fecundity to support fish growth within the environment;

removing the fish when they mature to a predetermined size, and replacing the mature fish with young fish.

\* \* \* \* \*